United States Patent [19]

Sato et al.

[11] Patent Number: 4,837,047

[45] Date of Patent: Jun. 6, 1989

[54] CONTAINER AND METHOD FOR STORING BLOOD

[75] Inventors: Toru Sato, Yonago; Atsuya Matsuda, Tokyo; Masaru Shibata; Masayuki Onohara, both of Kanagawa, all of Japan

[73] Assignee: Sumitomo Bakelite Co., Ltd., Tokyo, Japan

[21] Appl. No.: 209,483

[22] Filed: Jun. 20, 1988

Related U.S. Application Data

[63] Continuation of Ser. No. 752,537, Jul. 8, 1985, abandoned.

[30] Foreign Application Priority Data

Jul. 16, 1984 [JP] Japan ................ 59-145948
Jul. 16, 1984 [JP] Japan ................ 59-145949

[51] Int. Cl.$^4$ ............... G01N 1/00; G01N 33/48
[52] U.S. Cl. ............................... 422/41; 422/102; 604/262; 604/408; 604/409; 604/410; 428/447; 428/35.2; 428/36.8
[58] Field of Search ............ 422/41, 102; 604/262, 604/408–410; 428/35, 447

[56] References Cited

U.S. PATENT DOCUMENTS

| | | |
|---|---|---|
| 4,082,509 | 4/1978 | Talcott . |
| 4,119,267 | 10/1978 | Kydonieus ............... 604/408 X |
| 4,132,594 | 1/1979 | Bank et al. ............... 422/48 X |
| 4,228,032 | 10/1980 | Talcott ............... 128/272 X |
| 4,362,158 | 12/1982 | Lena ............... 128/272 |
| 4,490,420 | 12/1984 | Yoshida ............... 604/408 X |
| 4,496,361 | 1/1985 | Kilkson . |
| 4,507,123 | 3/1985 | Yoshida ............... 604/408 |
| 4,528,220 | 7/1985 | Hwo ............... 604/408 X |
| 4,582,762 | 4/1986 | Onohara et al. ....... 128/DIG. 21 X |
| 4,588,401 | 5/1986 | Kilkson ............... 604/408 |

FOREIGN PATENT DOCUMENTS

| | | |
|---|---|---|
| 0054221 | 6/1982 | European Pat. Off. . |
| 0074178 | 3/1983 | European Pat. Off. . |
| 0143994 | 6/1985 | European Pat. Off. . |
| 3444155 | 6/1985 | Fed. Rep. of Germany . |
| 116466 | 8/1984 | Japan . |
| 5811330 | 8/1984 | Japan . |
| 189154 | 10/1984 | Japan . |
| 197256 | 11/1984 | Japan . |
| 58218526 | 8/1985 | Japan . |
| 2065067 | 6/1981 | United Kingdom . |

OTHER PUBLICATIONS

Transfusion, vol. 11, No. 3, 123–133, May–Jun. 1971.
J. Lab. Clin. Med., 80, (5), 723–728 (1972).
Blood, 46, (2), 209–218, Murphy and Gardner (1975).

Primary Examiner—Michael S. Marcus
Assistant Examiner—Lynn M. Kummert
Attorney, Agent, or Firm—Browdy & Neimark

[57] ABSTRACT

A container for storing blood for a long period of time to keep the quality of the blood in good condition, is formed of a laminated film type bag composed of at least one thermoplastic resin film layer and at least one addition polymerization type silicone rubber film layer, the surface of the laminated film which comes in direct contact with the blood is made of the addition polymerization type silicone rubber film layer; the thermoplastic resin film layer has a permeability to carbon dioxide gas of 6,000 to 70,000 ml/m$^2$.24 hr. for a thickness of 0.025 mm at 25° C.; and the whole laminated film type bag has a permeability to carbon dioxide of 5,000 ml/m$^2$.24 hr.atm at 25° C. for storing whole blood and packaged red blood cells, and a permeability to carbon dioxide of 2,000 to 9,000 ml/m$^2$.24 hr. atm at 25° C. for storing platelet preparations.

8 Claims, No Drawings

CONTAINER AND METHOD FOR STORING BLOOD

This application is a continuation of application Ser. No. 752,537, filed July 8, 1985, now abandoned.

FIELD OF THE INVENTION

This invention relates to containers and method for storing blood and blood component preparations such as whole blood, packed red blood cells, platelet concentrates and the like (hereinafter referred to as "blood").

PRIOR ART

Storage of blood, in particular whole blood and erythrocytes has heretofore been conducted by collecting blood into a glass container or a polyvinyl chloride bag and storing the same in a refrigerator at a low temperature of 4° to 6° C. In particular, polyvinyl chloride bags are flexible; are good in transparency; have so high a heat resistance that they can be sterilized by steam under pressure, so high a low temperature resistance that they can withstand low temperatures during storage of blood, and so high a mechanical strength that they can withstand various procedures for separating components of blood; are easily handled; and are excellent also sanitarily. Therefore, they have been widely used in the world. Moreover, they are known to be superior to glass containers in blood-storing ability. However, even when blood is stored in such a polyvinyl chloride bag, the functions of erythrocytes, particularly their oxygen-transporting ability, are lowered with an increase of days of storage, and hence MOH (Ministry of Health) regulations require that whole blood be stored no more than 21 days in Japan. In particular, blood stored for more than 2 weeks is seriously deteriorated in oxygen transport ability, and this deterioration becomes a clinical problem particularly in packaged red blood cells containing a reduced amount of plasma component.

On the other hand, although the demand for platelet preparations has increased greatly in recent years for the purpose of imparting an aggregation function, the platelet preparations lose in a short time their adhering ability and aggregation function ability which are functions normally possessed by platelets. Therefore, in Japan, their storage period is up to 48 hours at ordinary temperature from blood collection, but during this period substantially half of more of the platelet preparations lose their functions. Maintenance of the blood-oxygen-transporting ability of erythrocytes and the aggregation function ability of platelets for a longer period of time is useful for effective utilization of limited blood resources and moreover is a fundamental and important problem which influences the effect of blood transfusion. Therefore, it has heretofore been eagerly investigated.

Many of the investigations on storage of the oxygen-transporting ability of blood for a longer period of time relate to preserving solutions, and there have been proposed methods which comprise adding inosine, adenine, adenosine or the like to a preserving solution. Particularly as to adenine, Lee Wood et al. have reported in "Transfusion" Vol. 11, No. 3, p. 123–133 (1971) that blood can be stored for 35 days by simultaneous use of an acidic citrate-glucose solution and adenine, and that this method is a main storage method in Sweden. It has been reported in "J. Lab. and Clin. Medicine", Vol. 80, No. 5, p. 723–728 (1972) that the pH of blood has a great influence on storage of blood and that the permeability to gas of the synthetic resin used in a container for storing blood has a great influence on the functions of blood or blood component preparations. That is to say, in a container poor in permeability to carbon dioxide gas, in which carbon dioxide gas generated by the metabolism of glucides in stored blood is accumulated, the pH of the stored blood is lowered, so that the metabolism of glucides is inhibited, resulting in deterioration of the functions of the blood.

On the basis of the facts described here, in Japanese Patent Application Kokai (Laid-Open) No. 20,683/78, Dow Corning has proposed a bag for storing blood in which blood is stored in the presence of hardened silicone rubber incorporated with $Ca(OH)_2$, and has disclosed that the functions of erythrocytes can be maintained for 40 days or longer. Further, while the effect of shaking is also shown therein, the effects of gas permeability of the bag, that is the partial pressure of gases inside of the bag, was not directly measured. From the fact that maintenance of the pH at a higher value is advantageous, it has been found that as an anticoagulant, a CPD (citrate-phosphate-dextrose) solution having a large pH-buffering effect is superior to an ACD (acid-citrate-dextrose) solution, and a storage method using a CPD solution has come to be made practicable. Further, Hamazaki et al. have reported that the 2,3-DPG (2,3-diphosphoglycerate) of erythrocytes can be kept higher level by adding PEP (phosphoenolpyruvate) to ACD blood and CPD blood (bloods incorporated with an ACD solution and a CPD Solution, respectively), but this method has not yet been made practicable because of the difficulty of the procedures in sterilization and the like.

In addition, as containers for storing blood, there are bags for frozen blood which are used in a frozen state at extra-low temperatures such as −30° C. −80° C., −196° C. and the like, and for these purposes there have been proposed bags made of a film of polyimide, fluorine-contained resin, stretched polyethylene or the like. Increase of days of storage of precious blood of rare types is important for effective utilization of resources. In a frozen condition, erythrocytes can be stored for at least 1 year, and such bags have already been made fit for practical use for storage of special blood and fractionated components of blood. However, it is known that much difficulty is required for removing antifreezing agents such as glycerol or the like which are added at the time of freezing the blood, and the bags have not yet come into wide use except for their use for storing fresh frozen plasma at −30° C.

As to platelets, Murphy and Gardner disclosed in the article in "Blood" Vol. 46, p. 209–218 (1975) that when a container made of polyvinyl chloride resin is used for storing platelet concentrates, a lowering of the pH is caused, resulting in loss of the viability of the platelets, but that when a container made of polyethylene is used, the pH is only slightly lowered. Further, as a result of investigation on conditions necessary for maintaining the viability of platelets, they have revealed the following: (1) lactic acid produced by glycolysis of platelets lowers the pH, and lower pH is almost in inverse proportion to the number of platelets; (2) when carbon dioxide gas produced by glycolysis of platelets is allowed to escape outside a storage container and the partial pressure of oxygen increases in the container at the same time, the glycolysis is inhibited; (3) although employment of polyethylene film having a good permeability to gas as a material for a storage container is advantageous, polyvinyl chloride film has the same effect as that of polyethylene film when it is formed into thin film to make it easily permeable to gas.

On the basis of these facts, Japanese Patent Application Kokai (Laid-Open) No. 29465/83 presents containers for storing platelets made of a laminate or coextruded product of a copolymer, ionomer or ionomer/polyester elastomer of ethylene and an α-olefin and a linear low-density polyethylene elastomer (hereinafter referred to "olefin resin"). It presents a container having a permeability to carbon dioxide gas of 3,870 to about 7,000 ml/m$^2$.24 hr.atm and that to oxygen of about 1,500 ml/m$^2$.24 hr.atm or higher, and it discloses that when the permeability to carbon dioxide gas is lower than 3,870 ml/m$^2$.24 hr.atm, carbon dioxide cannot escape sufficiently from the container while when the permeability is higher than 7,000 ml/m$^2$. 24 hr.atm, the pH of the liquid containing platelets becomes 7.5 or higher resulting in a lowering of the viability of the platelet. However, this container is unsuitable for storing erythrocytes because it tends to cause hemolysis, and it is very difficult to produce a film having thickness of only 0.08 to 0.23 mm and which, in any event is insufficient in strength. Therefore, this container has not yet been approved in Japan.

In Japanese Patent Application Kokai (Laid-Open) No. 189,154/84, there has been proposed a resin composition comprising a stabilizer and a graft copolymer obtained by reacting a styrene-butadiene copolymer and/or a derivative thereof with a vinyl chloride series monomer in the presence of a polymeric plasticizer such as a linear polyester, an ethylene type copolymer or the like. There is prescribed therein a permeability of carbon dioxide gas of 2.5 to $9.0 \times 10^3$ ml/m$^2$.24 hr.atm. However, in the case of said resin composition, the permeability is at most 3,000 ml/m$^2$. 24 hr.atm at a thickness of 0.4 mm, and in order to attain a high permeability to gas, the thickness should be adjusted to 0.2 mm or less; at this thickness, said resin composition is, by itself, insufficient in strength.

Further, for the purpose of preventing adhesion of platelets to a bag for blood and a lowering of the clothing ability of platelets by a DOP (dioctyl phthalate) plasticizer used in a polyvinyl chloride bag, there has been proposed in Japanese Patent Application Kokai (Laid-Open) No. 197,256/84, a polyvinyl chloride bag thinly coated with a silicone resin comprising aminoalkylsiloxane-dimethylsiloxane series alkylsiloxane units as its main constituent to such an extent that the thermal adhesiveness is not deteriorated. And a blood bag made of a polyvinyl chloride resin has been proposed in Japanese Patent Application Kokai (Laid-Open) No. 116,466/81, in which at least a part of the surface of polyvinyl chloride has a crosslinked layer, and a layer of a organopolysiloxane having a linear structure is formed on the crosslinked layer. However, films of these silicone resins have a low strength, and crack in some cases.

The present inventors have conducted extensive research on storage of blood, in particular, whole blood and packaged red blood cells, and have consequently found that when blood or packaged red blood cells packed in a plastic container made of a thin film of polyvinyl chloride or polyethylene is stored at 4° to 6° C., the cell components can be stored for a fairly long period of time, while retaining their functions sufficiently; during the storage, the partial pressure of carbon dioxide gas in the blood is kept low; and the pH is lowered only slightly.

OBJECT OF THE INVENTION

An object of this invention is to provide, for improving the above-mentioned defects of conventional containers for storing blood, a container made of plastics for storing blood which makes it possible to increase days of possible storage of blood while keeping the functions intrinsic to erythrocytes, in the case of storing blood, in particular whole blood or packaged red blood cells at 0° to 6° C.; the container is excellent in permeability to gas, in particular, carbon dioxide gas; and the container can be used also as a container for storing platelets by applying this invention.

Further another, object of this invention is to provide a method for storing blood using the above-mentioned container for storing blood.

DETAILED EXPLANATION OF THE INVENTION

This invention relates to a container for whole blood, packed red blood cells or platelet preparations (and/or platelet concentrates and platelet rich plasma), characterized in that it is made of a synthetic resin film which has permeabilities to carbon dioxide gas of 5,000 ml/m$^2$.24 hr.atm or higher at 25° C. for storage of whole blood and 2,000 to 9,000 ml/m$^2$.24 hr.atm at 25° C. for storage of platelets, for the purpose of making it possible to remove carbon dioxide gas in blood easily; has an excellent fitness for blood i.e. blood compatibility of its surface to be contacted with blood, has a rigidity of 5 kg/cm width or less in terms of tensile strength, permits easy handling of the storage container; and has a strength of seal by heat seal or adhesion of 1.5 kg/cm width or more, so that the film is excellent in bag-forming property.

Investigation by the present inventors has revealed that in storing blood, the storage life can be improved by maintaining the partial pressure of carbon dioxide gas at 85 mmHg or lower, preferably 50 mmHg or lower, and storing the blood at not higher than 6° C. and not lower than 0° C., preferably not higher than 6° C. and not lower than 4° C. so that even after storage for 2 weeks, the concentration of 2,3-DPG is 2.0 μmol/ml erythrocytes or higher and the pH is 6.7 or higher. Satisfaction of these conditions is closely related to material (material for storage container) and storage method.

For maintaining the partial pressure of carbon dioxide gas in stored blood at 85 mmHg or lower, preferably 50 mmHg or lower, the material for the container is preferably a film having a permeability to carbon dioxide gas of at least 5,000 ml/m$^2$.24 hr.atm, preferably 7,000 to 20,000 ml/m$^2$.24 hr.atm. As films having such a permeability, there can be exemplified films of flexible polyvinyl chloride resins (80 thickness μ), polyethylenes (200 thickness μ), polybutadiene (500 thickness μ), etc. for example, when the permeability to carbon dioxide gas is 5,000 ml/m$^2$.24 hr.atm.

The film may be composed of a single layer, but from the viewpoint of flexibility, permeability to gas, biological characteristics, strength and the like which are characteristics required of a container for storing blood, a storage container having more excellent characteristics can be obtained by producing a composite material by combining two or more thermoplastic synthetic resin layers which reinforce each other. As a material for the outer layer of the storage container, there is preferably used a film which is highly permeable to gas and is excellent in flexibility and mechanical strength. As a material for the inner layer, there is preferably used a resin layer which is highly permeable to gas, has good blood compatibility, and is biologically and chemically safe. As the intermediate layer in the case when the film is composed of three or more layers, there is preferably used, in particular, a resin layer having a high permeability to gas.

The resin having a good blood compatibility which can be used as the inner layer includes flexible polyvinyl chloride polymers, polyethylene polymers, EVA, polyurethane polymers, polybutadiene polymers, styrene-butadiene block copolymers, copolymers comprising these resins as their main constituents, blends thereof, silicone rubber, etc. However, since the resin used as a material for the inner layer comes in direct contact with blood and blood components, it should have a good blood compatibility and excellent chemical and biological safety, and evan a laminate film composed of two layers is limited in use as material for inner layer if the chemical and biological safety of the resin used in the aforesaid intermediate layer is not confirmed. Examples of the resin which has a good blood compatibility, is excellent in chemical and biological safety, and can be used as a material for the inner layer include flexible vinyl chloride resins, silicone rubbers, etc. As resins suitable as a material for the outer layer, there are exemplified polyvinyl chloride resins, polypropylene resins, EVA (ethylene-vinyl acetate copolymers), polyurethane resins, SEBS (styrene-ethylene-butadiene-styrene block copolymers), though polyvinyl chloride resins, polypropylene resins SEBS and the like are preferred when heat resistance (autoclave resistance) is required.

As the intermediate layer, suitable polymers are polybutadiene polymers, EVA, polyurethane polymers, SEBS, vinyl chloride-vinyl acetate copolymers, silicone rubbers and the like which has as high permeability to gas as at least two times that of vinyl chloride resins.

However, when as the outer or intermediate layer according to this invention, a porous synthetic resin layer is selected for the purpose of improving the permeability to gas greatly and in particular, its permeability to carbon dioxide gas is adjusted to 50,000 ml/m$^2$.24 hr.atm or higher, the resin usable in the outer or intermediate layer is not limited to the resins described above and can be selected more freely. However, the container for storing blood is preferably one which permits observation of its contents, and it should have transparency higher than at least semitransparency. The transparency of the porous material varies depending on the diameter and distribution density of pores, and in order to obtain a transparent to semitransparent porous film, it is necessary to adjust the pore diameter to 0.1 to 1,000 $\mu$ and the distribution rate of pores to 10 to 10$^6$ pores/cm$^2$.

Further, it is proposed to employ silicone rubber as a composite material, as a means of embodying the object of this invention more effectively. As silicone rubber is used as a film of pump-oxygenator, it is so highly permeable to oxygen gas and carbon dioxide gas that for example, its permeability to carbon dioxide gas reaches 200 to 500 times that of polyethylene. Further, it is known to be only slightly adhered to by platelets and hence is a material suitable for direct contact with blood. However, silicone rubber is generally poor in tear strength and hence cannot be used alone as a container for storing blood, and its adhesion to various thermoplastic resins is difficult. For these reasons, it has not been investigated as a material for containers for storing blood, though it has excellent heat resistance in addition to the features described above.

As to adhesion of silicone rubber which is the most serious problem thereof, as disclosed in Japanese Patent Application No. 203,699/83, the inventors have found that strong adhesion can be attained by a certain combination of a flexible polyvinyl chloride resin and an addition polymerization type silicone rubber. Further, as desclosed in Japanese Patent Application No. 32,607/84, we have found that polyolefin resins and addition polymerization type silicone rubbers adhere to each other very strongly. In addition, we have found that addition polymerization type silicone rubbers can adhere also to polyurethanes and the like.

This invention provides containers for storing blood which have a high permeability to carbon dioxide gas and moreover are supplied with necessary strength and heat resistance which cannot be given only by a thin film of thermoplastic resins.

The silicone rubber layer constituting the container for storing blood made of a silicone rubber series composite material of this invention is an addition polymerization type silicone. The term "addition polymerization type silicone" means a composition capable of being converted into an elastomer which is obtained by addition-polymerizing a polysiloxane containing vinyl groups represented by the general formula (1), an organohydrogenpolysiloxane represented by the general formula (2) and inorganic substances as reinforcing agents such as silica or the like by using a platinum series catalyst:

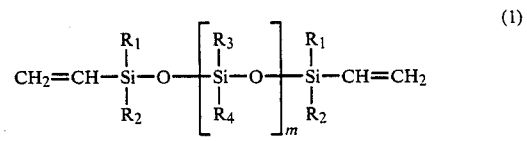
(1)

wherein each of $R_1$ through $R_4$ which may be the same or different, represents a monovalent hydrocarbon group having 6 or less carbon atoms, and m is a positive integer,

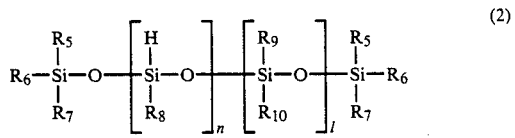
(2)

wherein each of $R_5$ and $R_7$ through $R_{10}$ which may be the same or different, represents a univalent hydrocarbon group having 6 or less carbon atoms; $R_6$ is a hydrogen atom or a monovalent hydrocarbon group having 3 or less carbon atoms which may be the same as or different from $R_5$ and $R_7$ through $R_{10}$; n is an integer of not more than 100 and not less than 2; and l is 0 or a positive integer of 100 or less. This composition is further increased in adhesive strength to thermoplastic resins when it contains an organohydrogenopolysiloxane having in the molecule two or more hydrogen atoms directly bonded to the silicon atom, in an amount sufficient for the organohydrogenosiloxane unit shown in the general formula (2) to give said hydrogen atoms, so that the ratio of said hydrogen atoms to the total vinyl groups shown in the general formula (1) is 0.8 or more, preferably not more than 6 and not less than 1.

Said composition can be incorporated also with epoxy compounds, carboxylic acid anhydrides, silanes or siloxanes containing acryloxy alkyl group represented by the general formula (3) or oxysilane compounds containing an unsaturated hydrocarbon group, as a constitutent used in a substance generally called "self-adhesive silicone rubber", or with resin-like copolymers containing vinyl groups which are dissolved in with the constituents represented by the general formulae (1) and (2), as a constituent for improving the physical properties of a cured layer obtained by conversion into an addition polymerization type silicone composition. The resin-like copolymer includes, for example, organopolysiloxanes which are copolymers of compounds of the general formulae (4), (5) and (6), etc.

$$CH_2=C-C-O-(CH_2)_k-Si\equiv \quad (3)$$
$$\phantom{CH_2=C}|\phantom{-}\|$$
$$\phantom{CH_2=C}R_{11}\phantom{-}O$$

wherein $R_{11}$ is a $CH_3-$ group or a hydrogen atom, and k is a positive integer of 1 to 3.

$$(CH_2=CH)(R_{13})(R_{14})SiO_{0.5} \quad (4)$$

$$SiO_2 \quad (5)$$

$$(R_{15})_3SiO_{0.5} \quad (6)$$

wherein each of $R_{13}$, $R_{14}$ and $R_{15}$ which may be the same or different, represents a hydrocarbon group having 6 or less carbon atoms.

The permeability to gas of the additional polymerization type silicone rubber is as very high as 200 to 500 times that of low-density polyethylene polymers. Although its permeability to gas has almost no inflence on that of the resulting laminate film because no anchor agent is used for the lamination, the thickness of the silicone rubber layer is preferably adjusted to 20μ to 1 mm, preferably 100 to 500μ because of the necessity of maintaining its strength.

As the thermoplastic resins film laminated with the silicone rubber, there can be used a film composed of one member or a blend resin of two or more members selected from the group consisting of flexible polyvinyl chloride resins, urethane resins, polyethylene resins, polypropylene resins, polybutadiene resins, ethylene-vinyl acetate copolymers (EVA), crosslinked polyethylene resins crosslinked EVA, ethylene-propylene copolymers ethylene-butadiene-propylene terpolymers, styrene-butadiene block copolymers and styrene-butadiene-ethylene terpolymers. The permeability of these resins to carbon dioxide gas ranges from 6,000 to 70,000 ml/m².2 hr.atm.0.025 mm and may be safely said to be high for thermoplastic resins. Though different depending on the resin, the maximum usable thickness of the film is 300μ.

As to the olefin resin film, the olefin resin is preferably one which has unsaturated double bonds in the molecule, as described in Japanese Patent Application No. 32,607/84. For example, employment of a material incorporated with a substance having unsaturated double bonds such as a polyethylene or a butadiene series polymer has a more advantageous effect on the adhesiveness. As described in Japanese Patent Application Nos. 244,187/83 and 32,608/84, when said thermoplastic resin film contains 0.01 to 10%, preferably 0.5 to 2% of an organohydrogenopolysiloxane containing an organohydrogenosiloxane unit in an amount of 30% or more based on the total constituents, its adhesion to the addition polymer type silicone rubber is further improved.

The addition polymerization type silicone rubbers according to this invention adhere sufficiently to, besides the above-mentioned thermoplastic resins, thermoplastic polyester resins, nylon resins, polycarbonates resins and the like, but these resins while high in film strength are low in permeability to gas. Therefore, when these resins are made into a porous film which is perforated so as not to lower the strength of the container itself, the lamination can be conducted without lowering the permeability to gas. Needless to say, a film produced by making the above-mentioned thermoplastic resin film porous may also be used: it is usable as at least one layer of synthetic resin layers constituting a laminate film. In particular, a porous film of continuous cells can give a high permeability to gas even if it has a large thickness, and hence it is effective. When a silicone rubber layer is adjacent to the porous film layer, the silicone rubber penetrates the porous film layer to deprive the same of the porosity in some cases, but since the permeability to gas of the silicone rubber itself is excellent, no trouble is caused. Opaque porous materials such as "Duragard" (manufactured by Celanese Corp.), "Nuclepore" (manufactured by General Electric Co.) and Millipore (manufactured by Millipore Corp.) which are used as microfilter, and Tyvek (manufactured by E. I. Du Pont de Nemours & Co.) which is nonwoven fabric, also can be given a practical transparency by lamination with silicone rubber and hence are usable.

As to a process for producing the present laminate film, it is sufficient to coat (or, if necessary, laminate) the addition polymerization type silicone composition on a thermoplastic resin film and crosslink the same by heating. As a method for the coating, a doctor-blade method, a roll-coater method, an air-knife method or the like is used, and the method for the coating is not critical. The addition polymerization type silicone composition may be diluted with a solvent such as hexane, toluene or the like in order to adjust its viscosity. Further, as another method, there may be employed a method which comprises extruding the addition polymerization type silicone into a film at ordinary temperature, and laminating this film on the thermoplastic resin film.

Although the structure of the laminate film is not critical, any thermoplastic resin other than silicone rubber may be used in the outermost layer. On the other hand, as the innermost layer, there should be selected a resin excellent in blood compatibility and bag-forming property. Particularly, in view of its adhesion to a port portion for taking-in and taking-out of blood, flexible polyvinyl chloride resins and the addition polymerization type silicone rubbers are particularly preferred. When the inner layer is made of the addition polymerization type silicone rubber, more effective is employment of an addition polymerization type silicone rubber in which the content of fillers such as silicon oxide and the like is reduced as much as possible, for the purpose of improving the blood compatibility. Needless to say, there can be olefin resins such as polyethylene resins, polypropylene resins and the like, and their copolymers and terpolymers.

A container for storing blood produced by such a material is required to be able to be used without any means of application or reduction of a pressure at the time of collection or discharge of blood. The rigidity of the material as a constituting material in terms of tensile strength should be 5 kg/cm of width or less, and for satisfying this condition, when there is used a film having a high tensile strength, for example a film of polycarbonate, nylon, polyester or the like, its thickness is preferably 0.1 mm or less, more preferably 0.025 to 0.05 mm. When a multilayer laminate film is used, the thickness of each of its inner and outer layers should be adjusted to at least 10μ or more for maintaining the strength, but when the layers become too thick, their flexibility is deteriorated. Therefore, in general, the thickness of each inner and outer layer is preferably 20% or less based on the total thickness except when such a layer is a porous film. The range of usable total thickness of the laminate film is limited as a matter of course, and is from 0.06 to 1.0 mm, preferably from 0.20 to 0.40 mm.

For the purpose of reinforcing a storage container such as a bag for blood, its outside may be covered with a porous film or a mesh-like sheet material, and as a material for the film or sheet, polyester, nylon, polypropylene, polyurethane, polyvinyl chloride resins and the like which are excellent in mechanical strength are suitable. The strength of the laminate film as a bag for blood or the like is determined not only by the strength of material but also by the strength of seal at the time of making a bag. Therefore, the synthetic resin film should be excellent in bag-forming property and its strength of seal is preferably 1.5 kg/cm of width or more.

When blood is stored by addition of a CPD storing solution by using such a storage container, for example when blood is stored in a storage container having such an excellent permeability to gas that its permeability to carbon dioxide gas is 5,000 to 20,000 ml/m$^2$.24 hr.atm and preferably 10,000 to 20,000 ml/m$^2$.24 hr.atm, the partial pressure of carbon dioxide gas is maintained at 85 mm Hg or lower even after storage for 2 weeks at not higher than 8° C. and not lower than 2° C. so that there can be maintained the pH at 6.75 or higher and the concentration of 2,3-DPG at 2.0 μmol/ml or erythrocytes. Even after storage for 3 weeks, the oxygen-transporting ability of the blood is kept high.

However, in the case of a storage container having a relatively lower permeability to carbon dioxide gas of, for example, 7,000 ml/m$^2$.24 hr.atm, when a conventional storage method is employed, the partial pressure of carbon dioxide gas becomes 100 mm Hg or more after storage for 2 weeks, and the concentration of 2,3-DPG becomes 1.5 μmol/ml of erythrocytes or less in some cases. However, by shaking the container during storage, the partial pressure of carbon dioxide gas is kept low, so that the concentration of 2,3-DPG can be kept high. The shaking may be either continuous or intermittent, and even light shaking of two or three times a day for several minutes, particularly for only the first several days, is effective. The effective of shaking is more remarkable in a container having a lower permeability to carbon dioxide gas, and is particularly high in a container having a lower permeability to carbon dioxide gas, and is particularly high in a container having a permeability to carbon dioxide gas of about 5,000 ml/m$^2$.24 hr.atm. In this specification, the measured value of the partial pressure of carbon dioxide gas in blood and that of pH which is directly affected thereby are values measured after raising the temperature from a low-temperature storage condition (4° to 6° C.) to 37° C. while keeping airtightness.

Similarly, an effect of improving the storing ability can be obtained by providing a space between adjacent storage containers in order to facilitate replacement of gas. It is also possible to control the partial pressure of gas in blood in the container by ventilation in a storage box and control of the composition of atmosphere gas, and the partial pressure of oxygen gas can be prevented thereby from rising too much particularly in storing concentrated platelet plasma.

Further, when a container having a permeability to carbon dioxide gas of 2,000 to 9,000 ml/m$^2$.24 hr.atm by virtue of the laminate film of this invention is applied to storage of platelets, very effective storage of platelets is possible.

EXAMPLE 1

Blood admixed with CPD was placed in a bag made of of film of polyvinyl chloride resin having a thickness of 400μ, 120μ, 60μ or 20μ and stored at 4° C. for 21 days. The partial pressure of carbon dioxide gas (PCO$_2$), pH, 2,3-DPG value and P50 of the blood after the storage were measured, and the relation between the oxygen-transporting function and storage period of the blood was investigated. The results obtained were as shown in Table 1. It can be seen that in the case of the film of polyvinyl chloride resin alone having a thickness of 20μ, the function of the blood was hardly deteriorated even after 3 weeks.

TABLE 1

| Thickness of film (μ) | Permeability to CO$_2$ (cm$^3$/m$^2$ · 24 hr · atm) | Value after 3 weeks ||||
|---|---|---|---|---|---|
| | | PCO$_2$ (mmHg) | pH | 2,3-Dephosphoglycerate μmol/ml erythrocytes | P50 (mmHg) |
| 400 | 1000 | 120 | 6.6 | 0.35 | 14.5 |
| 120 | 3500 | 100 | 6.6 | 0.50 | 16.0 |
| 60 | 7500 | 75 | 6.7 | 1.2 | 18.0 |
| 20 | 20000 | 25 | 6.8 | 4.4 | 24.0 |
| Initial value | — | 82 | 7.0 | 4.8 | 26.0 |

Note:
P50: A partial pressure of oxygen at which the degree of saturation with oxygen became 50%.
PCO$_2$, pH: Measured after raising the temperature to 37° C. while keeping airtightness.

EXAMPLE 2

By using bags for storing blood made of a film composed of a polyvinyl chloride resin layer having a thickness of 80μ as an inner layer and a polybutadiene layer having a thickness of 180μ as an outer layer, the characteristics of blood were measured by the same methods as in Example 1. The results obtained were as shown in Table 2.

TABLE 2

| Storage method | Permeability to CO$_2$ (cm$^3$/m$^2$ · 24 hr · atm) | Value after 3 weeks | | | |
|---|---|---|---|---|---|
| | | PCO$_2$ (mmHg) | pH | 2,3-Diphosphoglycerate (μmol/ml erythrocytes) | P50 (mmHg) |
| Allowed to stand as such | 6500 | 85 | 6.7 | 0.5 | 16.5 |
| Shaked during storage | — | 55 | 6.8 | 2.0 | 20.0 |
| Initial value | — | 85 | 7.0 | 4.2 | 26.0 |

EXAMPLE 3

Characteristics of various laminate films are rated in terms of marks and compared. The results obtained are shown in Table 3.

Each of the films thus obtained was made into a bag by high-frequency working or heat seal. As the port, a tube made of the same material as that for the layer forming the inner surface was used at the time of the high-frequency working or the heat seal. When silicone

TABLE 3

| | Film structure inner layer/outer layer | Permeability to CO$_2$ | Heat resistance | Mechanical strength | Strength of seal | Work-ability | Blood-storing ability | Water-barrier property |
|---|---|---|---|---|---|---|---|---|
| Comparative Example | VC (80)/EVA (280) | Δ | x | o | o | o | Δ-x | o |
| Example | PP (100)/PET (25) | Δ | ◎ | o | o | o | Δ | o |
| | VC (50)/porous PP (150) | ◎ | ◎ | o | o | o | o | Δ |
| | PP (50)/porous PP (150) | ◎ | ◎ | o | o | o | o | o |
| | VC (20)/PB (180)/VC (20) | o | o | o | o | o | o | o |
| | PU (50)/porous PP (150)/VC (20) | o | o | o | o | o | o | o |
| | VC (50)/EVA (100) | ◎ | x | Δ | Δ | o | o | o |

Note:
VC—vinyl chloride resin
PP—polypropylene
PET—polyethylene terephthalate
PU—polyurethane
PB—polybutadiene
Numeral values in parentheses after marks: thickness (μ)
An excellent result is expressed by ◎, a good result by o, a somewhat good result by Δ, and a very unfavorable result by x.

EXAMPLE 4

Various plastics films were coated with an addition polymerization type silicone composition prepared by adding 6 parts of a polysiloxane consisting of 10 mol% of a trimethylsiloxane unit, 40 mol% of a dimethylsiloxane unit and 50 mol% of a methylhydrogenosiloxane unit, 20 parts of silica and 0.2 part of a solution of chloroplatinic acid dissolved in isopropyl alcohol (platinum content: 1%) to 100 parts of a dimethylpolysiloxane which has a viscosity at 25° C. of 18,000 cs and in which both ends of the molecular chain are dimethylvinylsilyl groups. The coated plastics are pressed at 110° C. for 2 hours to obtain laminate films. As comparative examples, there were prepared thermoplastic resin films and laminate films by dry lamination.

rubber forms the inner surface layer, an addition polymerization type silicone of the same materials as those of the silicone rubber was coated, to a thickness of 100μ, on the portion forming the outside of the bag, and the coated product was pressed at 110° C. for 2 hours to obtain a bag. As the port in this case, a flexible vinyl chloride resin was used.

The permeability was determined by measuring a value according to ASTM-D for each laminate film. The heat resistance was determined by observing the deformation of each laminate film by sterization under pressure at 121° C. for 20 minutes. The strength was determined by placing 100 cc of water in each of the bags obtained, clamping the upper part of the bag, centrifuging the bag, and investigating the existence of rupture of the bag.

TABLE 4

| | | Film for container | Permeability to carbon dioxide ml/m$^2$/24 hr | Heat resistance (auto-clave resistance) | Strength (centrifugation resistance) Existence of rupture | Bag-forming workability | |
|---|---|---|---|---|---|---|---|
| | | | | | | Working method | |
| Comparative Example | 1 | VC (400) | 1000 | ◎ | ◎ | High-frequency working | ◎ |
| | 2 | VC (70) | 7000 | o | x | High-frequency working | x |
| | 3 | EVA (200) | 5000 | x | Δ | Heat seal | o |
| | 4 | PP (200) | 800 | ◎ | ◎ | Heat seal | o |
| | 5 | PP (30)/Adhesive/VC (60) | 1700 | Peeled off | o | High-frequency working | o |
| | 6 | PET (20)/Adhesive/PE (100) | 230 | Peeled off | o | Heat seal | o |
| | 7 | VC (20)/Adhesive/PB (180) | 6500 | Peeled off deformed | Δ | High-frequency working | o |
| Example of this invention | 1 | PP (30)/silicone (200) | 5000 | ◎ | o | Silicone adhesion | o |
| | 2 | PP (20)/silicone (150)/VC (60) | 5000 | ◎ | o | High-frequency working | o |
| | 3 | PP (20)/silicone (100)/ PE (100)/silicone (100) | 5300 | ◎ | o | Silicone adhesion | o |
| | 4 | HDPE (20)/silicone (100)/ Porous nylon (20)/ silicone (100) | 11000 | ◎ | ◎ | Heat seal | o |
| | 5 | Porous VC (150)/silicone (100)/ VC (70) | 5800 | ◎ | o | High-frequency working | ◎ |

TABLE 4-continued

| | Film for container | Permeability to carbon dioxide ml/m²/24 hr | Heat resistance (auto-clave reistance) | Strength (centrifugation resistance) Existence of rupture) | Bag-forming workability Working method | |
|---|---|---|---|---|---|---|
| 6 | HDPE (20)/silicone (200)/ Porous PP (70) | 10500 | ◎ | ◎ | Heat seal | o |

Note:
VC: flexible vinyl chloride resin
EVA: ethylene-vinyl acetate copolymer
PP: ethylene-propylene copolymer
PET: thermoplastic polyester
PE: polyethylene
PB: polybutadiene
HDPE: high-density polyethylene
Adhesive: isocyanate adhesive
Numeral values in parentheses after marks: thickness ($\mu$)

EXAMPLE 5

Into each of a bag made of flexible polyvinyl chloride resin (VC 400) as a comparative example and containers made of a laminate film of PP (30)/silicone (200) and of porous VC (500)/silicone (100)/VC (70) as examples of this invention was pipetted 60 ml of whole human blood containing ACD, and stored at 4° C., and the pH change and P50 which is an index of retention state of the function of erythrocyte were measured. The measurement of P50 was carried out by using a hemox analyzer. The results of the measurements are shown in Table 5.

TABLE 5

| | pH | | P50 (mmHg) | |
|---|---|---|---|---|
| | Initial value | After 21 days | Initial value | After 21 days |
| Bag made of polyvinyl chloride | 7.1 | 6.5 | 25.4 | 13.7 |
| PP/silicone | 7.0 | 6.8 | 26.1 | 19.2 |
| Porous VC/ silicone/VC | 7.1 | 6.7 | 26.3 | 18.6 |

EFFECTS OF THE INVENTION

As is evident from the above Examples, by using a material having a high permeability to carbon dioxide gas as a synthetic resin film constituting a container for storing blood, deterioration with the lapse of time of the function of erythrocytes for blood transfusion can be reduced, so that the possible storage period of stored blood can be extended. Further, according to the method of this invention using a laminate film produced by integrally combining two or more kinds of thermoplastic synthetic resin layers, or integrally combining a thermoplastic synthetic resin film and an addition polymerization type silicone rubber layer, there can be obtained a practically usable container for storing blood the constitutive layers or film of which mutually make up for the defects of the single layer of each resin, and which is hence excellent in permeability to carbon dioxide gas and blood-storing ability, and moreover is well balanced among physical properties such as heat resistance, mechanical strength, easiness of handling and the like. Further, there can be provided an excellent method for storing blood.

What is claimed is:

1. A container for storing blood comprising a laminated film type bag for storing whole blood or packaged red blood cells, having heat-resistance sufficient to withstand sterilization by steam under pressure, and having an inner blood-contacting surface and an exterior surface, said laminated film type bag being composed of at least one thermoplastic resin film layer and at least one addition polymerization type silicone rubber film layer; said inner blood-contacting surface of said laminated film type bag being made of said at least one addition polymerization type silicone rubber film layer; said at least one thermoplastic resin film layer having a permeability to carbon dioxide gas of 6,000 to 70,000 ml/m².24 hr. for a thickness of 0.025 mm at 25° C.; said laminated film type bag having a permeability to carbon dioxide gas of at least 5,000 ml/m².24 hr.atm; and said bag having a rigidity of at most 5 kg/cm of width in terms of tensile strength and a heat seal or adhesive working strength of at least 1.5 kg/cm of width.

2. The container for storing blood according to claim 1, wherein said at least one thermoplastic resin film layer is a film made of one member or a blended resin of two or more members selected from the group consisting of flexible polyvinyl chloride resin, polyolefin resin, polyurethane elastomer and polystyrene.

3. The container for storing blood according to claim 1, wherein said at least one thermoplastic resin film layer is composed at least partially of a porous film having a permeability to carbon dioxide gas of at least 50,000 ml/m².24 hr.atm at 25° C.

4. The container for storing blood according to claim 1, wherein the laminated film type bag composed of at least one thermoplastic resin film layer and at least one addition polymerization type silicone rubber film layer has a total thickness of 0.06 to 1.0 mm.

5. A container for storing blood comprising a laminated film type bag for storing platelet preparations, having heat-resistance sufficient to withstand sterilization by steam under pressure, said laminated film type bag being composed of at least one thermoplastic resin film layer and an inner blood-contacting film layer composed of at least one addition polymerization type silicone rubber; said at least one thermoplastic resin film layer having a permeability to carbon dioxide gas of 6,000 to 70,000 ml/m².24 hr. for a thickness of 0.025 mm at 25° C.; said laminated film type bag having a permeability to carbon dioxide gas of 2,000 to 9,000 ml/m².24 hr.atm at 25° C., a rigidity of at least 5 kg/cm of width in terms of tensile strength and a seal strength by heat seal or by adhesion working of at least 1.5 kg/cm of width.

6. The container for storing blood according to claim 5, wherein said at least one thermoplastic resin film layer is a film made of one member or a blended resin of two or more members selected from the group consisting of flexible polyvinyl chloride resin, polyolefin resin, polyurethane elastomer and polystyrene.

7. The container for storing blood according to claim 5, wherein said at lest one thermoplastic resin film layer is composed at least partially of a porous film having a permeability to carbon dioxide gas of at least 50,000 ml/m$^2$.24 hr.atm at 25° C.

8. The container for storing blood according to claim 5, wherein the laminated film type bag composed of at least one thermoplastic resin film layer and at least one addition polymerization type silicone rubber film layer has a total thickness of 0.06 to 1.0 mm.

* * * * *